United States Patent
Aglietti et al.

(10) Patent No.: US 6,766,435 B1
(45) Date of Patent: Jul. 20, 2004

(54) PROCESSOR WITH A GENERAL REGISTER SET THAT INCLUDES ADDRESS TRANSLATION REGISTERS

(75) Inventors: Robert Bruce Aglietti, San Jose, CA (US); Kenneth Mark Wilson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 09/583,795

(22) Filed: May 31, 2000

(51) Int. Cl.[7] ............................................. G06F 12/06
(52) U.S. Cl. .................... 711/209; 712/228; 711/209
(58) Field of Search .......................... 711/209, 202, 711/203, 205, 206, 207; 712/228, 208

(56) References Cited

U.S. PATENT DOCUMENTS

| | | | | |
|---|---|---|---|---|
| 5,504,872 A | * | 4/1996 | Tanaka ....................... | 711/203 |
| 5,574,927 A | * | 11/1996 | Scantlin ....................... | 712/41 |
| 5,640,528 A | * | 6/1997 | Harney et al. ............... | 711/206 |
| 6,061,773 A | * | 5/2000 | Harvey et al. ............... | 711/206 |
| 6,073,231 A | * | 6/2000 | Bluhm et al. ................ | 712/218 |
| 6,085,296 A | * | 7/2000 | Karkhanis et al. .......... | 711/147 |
| 6,212,629 B1 | * | 4/2001 | McFarland et al. ......... | 712/241 |
| 6,233,668 B1 | * | 5/2001 | Harvey et al. ............... | 711/147 |
| 6,578,071 B2 | * | 6/2003 | Hagersten et al. .......... | 709/215 |
| 6,591,359 B1 | * | 7/2003 | Hass et al. ................... | 712/217 |

* cited by examiner

Primary Examiner—Pierre Bataille

(57) ABSTRACT

A processor having one or more address translation registers for holding translation information that enables translations from virtual addresses to physical addresses. The address translation registers may be allocated to a set of logical areas of a process and the logical areas may be allocated to physical pages so as to enhance a likelihood that translation information for the process will be available in the address translation registers. The address translation registers are saved and restored during context switches. The address translation registers may be used with or without translation look-aside buffers.

20 Claims, 4 Drawing Sheets

PROCESSOR WITH A GENERAL REGISTER SET THAT INCLUDES ADDRESS TRANSLATION REGISTERS

BACKGROUND OF THE INVENTION

1. Field of Invention

The present invention pertains to the field of processors. More particularly, this invention relates to address translation registers in a processor.

2. Art Background

A computer system typically includes a processor and a main memory. The main memory of a computer system usually stores instructions and data. A processor typically reads the instructions from the main memory and executes the instructions. The execution of the instructions may cause the processor to read data from the main memory and/or write data to the main memory.

A processor typically has a processor architecture which includes a virtual address space for referencing instructions and data. The main memory, on the other hand, usually has a memory architecture which includes a physical address space for storing instructions and data. Typically, the physical address space of a main memory is much smaller than the virtual address space of a processor. In addition, the physical address space of a main memory may have discontinuities in its range of valid addresses.

As a consequence, computer systems commonly include address translation mechanisms for converting the virtual addresses used by a processor to the appropriate physical addresses for the main memory. Such address translation mechanisms typically enable the implementation of virtual memory mechanisms and allow very large processes with large data structures to be executed using a relatively small main memory.

An address translation mechanism for a computer system typically includes a page directory which is stored in main memory. A page directory usually includes a set of entries each of which contains information for translating virtual addresses to the appropriate physical addresses. In addition, prior processors commonly include translation look-aside buffers (TLBs) that hold a subset of the entries of the page directory. A TLB may be viewed as a cache of page directory entries. TLBs usually enhance the speed of a processor by avoiding main memory accesses to the page directory during translation of virtual addresses to physical addresses.

It is usually desirable that a TLB in a processor be implemented such that a TLB lookup can be performed in a single processor cycle or relatively few processor cycles. Prior processors typically achieve such TLB lookup speeds by limiting the storage capacity of a TLB. Unfortunately, such limited capacity usually increases the likelihood of a TLB miss which in turn causes a very slow access to the page directory in the main memory. Such main memory accesses during address translation usually slow the performance of a processor. In addition, a TLB in a processor can become polluted during context switches among processes. Unfortunately, such pollution of a TLB usually increases the likelihood of a TLB miss and a resulting slow main memory access to the page directory.

SUMMARY OF THE INVENTION

A processor is disclosed having one or more address translation registers for holding translation information that enables translations from virtual addresses to physical addresses. The address translation registers may be allocated to a set of logical areas of a process and the logical areas may be allocated to physical pages so as to enhance a likelihood that translation information for the process will be available in the address translation registers. The address translation registers are saved and restored during context switches. The address translation registers may be used with or without translation look-aside buffers.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
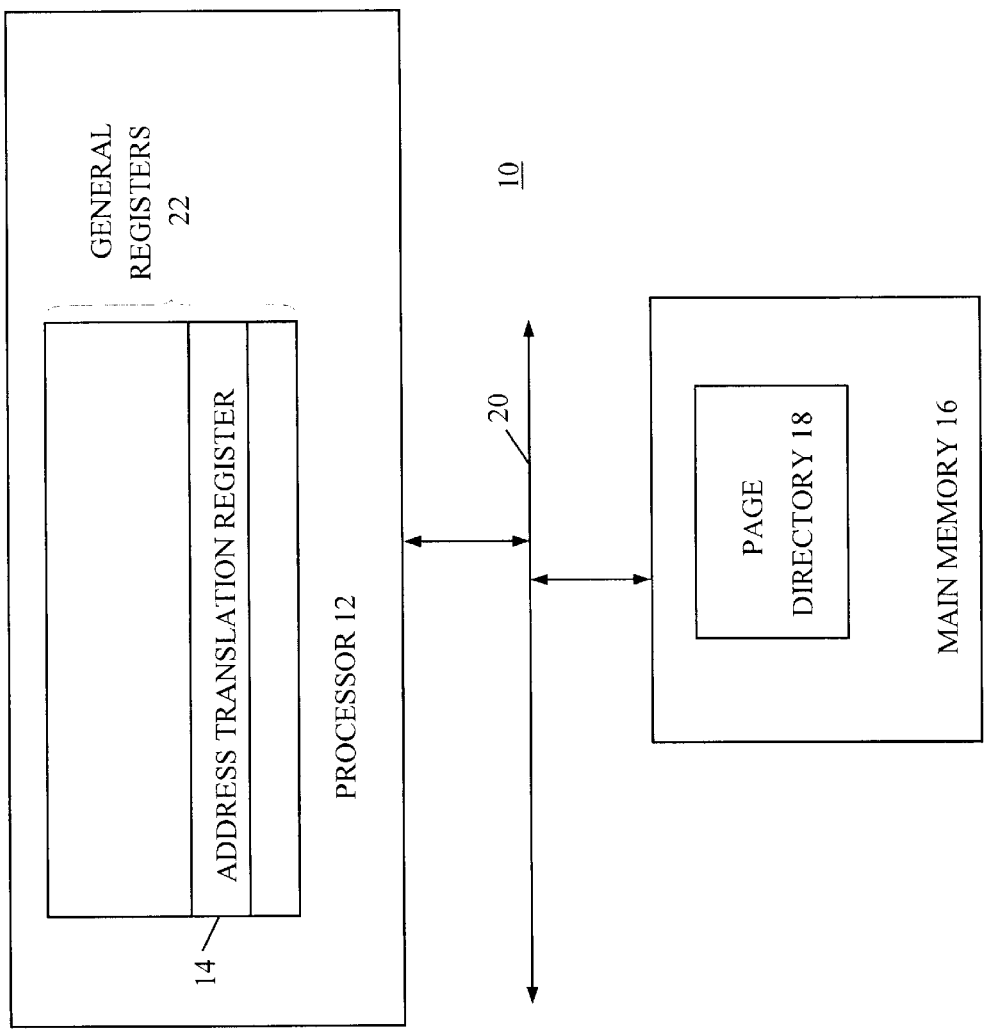
FIG. 1 shows a computer system having a processor according to the present techniques.

FIG. 1 shows a computer system 10 having a processor 12 according to the present techniques. The processor 12 includes an address translation register 14 which in one embodiment is one of a set of general registers 22 in the processor 12. The processor 12 in other embodiments may include any number of address translation registers.

The address translation register 14 holds a set of translation information for translating virtual addresses to physical addresses. The translation information contained in the address translation register 14 in one embodiment is obtained via a bus 20 from a page directory 18 which is maintained in a main memory 16 of the computer system 10.

The general registers 22 includes other registers according to a particular architecture of the processor 12. For example, the general registers 22 may include instruction pointer registers, data pointer registers, memory segment registers, stack addressing registers, data storage registers as well as registers that hold information describing execution states for the processor 12, to name a few examples. The contents of the general registers 22 including the address translation register 14 may be referred to as the processor state for the processor 12.

The address translation register 14 is handled in the same manner during context switches as the remainder of the general registers 22. For example, during a context switch the contents of all the general registers 22 may be saved in memory and loaded from memory with the processor state for a new context. Alternatively, the processor 12 may include multiple general register sets including multiple sets of address translation registers for providing processor state for multiple threads. In addition, the processor 12 may implement special instructions for saving and restoring the processor state which would also save and restore the address translation register 14.

The translation information in the address translation register 14 in one embodiment includes a physical page number and a set of protection bits for the corresponding physical page. The physical page number provides the upper bits a physical addresses. The physical page number and protection bits in one embodiment are those that are maintained in the page directory 18 for corresponding virtual page numbers.

The information in the address translation register 14 is static, thereby enabling a relatively fast check to be performed when verifying page mapping and accessibility of a page. The page mapping information may be obtained from the address translation register 14 in less than a processor cycle of the processor 12 in contrast to TLBs which may take many processor cycles.

In one embodiment, the address translation register 14 is used for translating virtual addresses to physical addresses during instruction fetches by the processor 12. In another embodiment, the address translation register 14 is used for translating virtual addresses to physical addresses during data reads and writes by the processor 12. In yet another embodiment, the address translation register 14 is used for translating virtual addresses to physical addresses during instruction fetches and data reads and writes by the processor 12.

Figure 2:
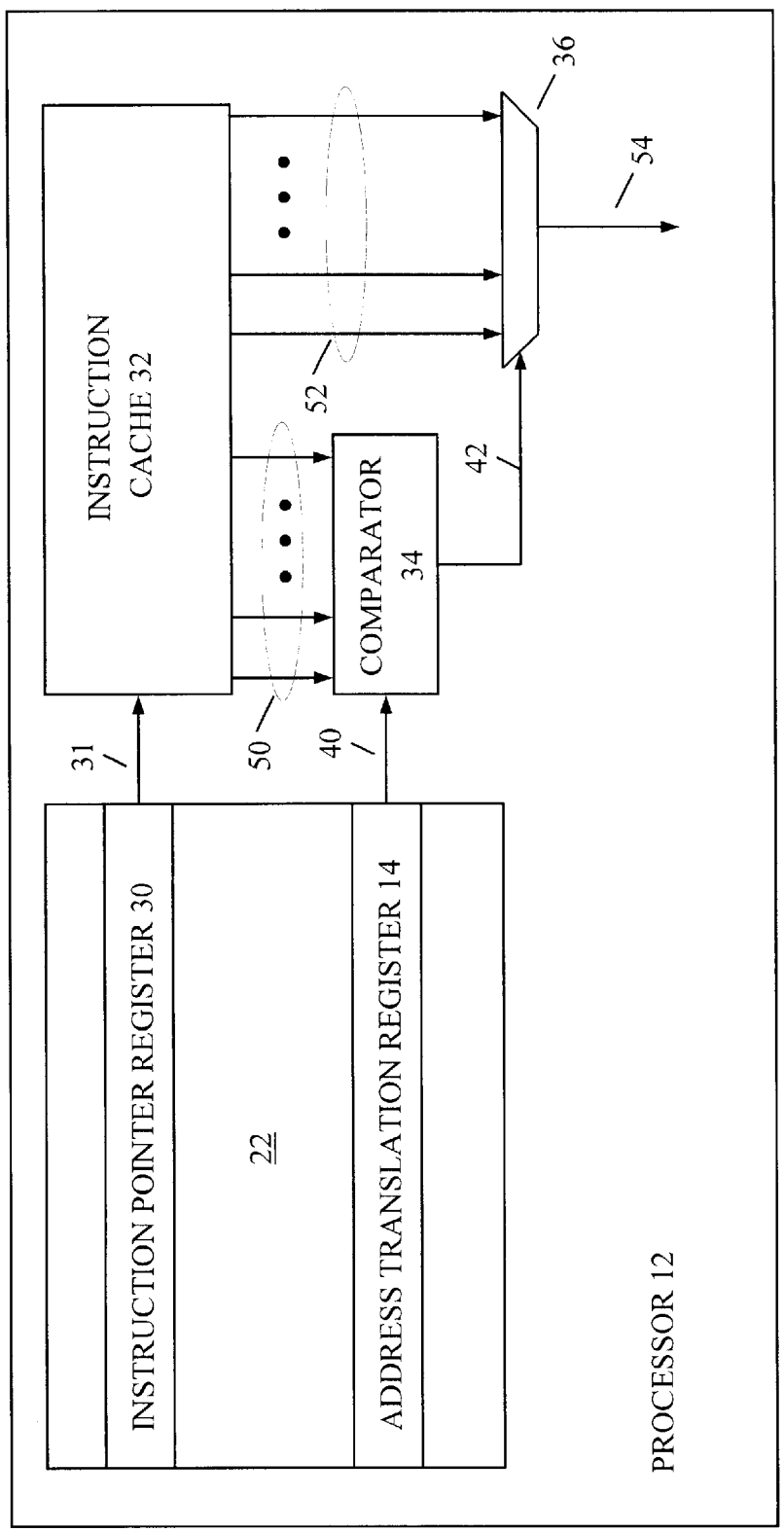
FIG. 2 shows an embodiment in which an address translation register is used for translating virtual addresses to physical addresses during instruction fetches by a processor.

FIG. 2 shows an embodiment in which the address translation register 14 is used for translating virtual addresses to physical addresses during instruction fetches by the processor 12. The general registers 22 of the processor 12 in this embodiment include an instruction pointer register 30 that holds a virtual address of an instruction to be fetched. The processor 12 in this embodiment includes an instruction cache 32.

The virtual address from the instruction pointer register 30 provides an address input 31 to the instruction cache 32. Multiple sets of tags 50 and instructions 52 from the entries of the instruction cache 32 selected by the address input 31 are read out to a comparator 34 and a multiplexer 36, respectively. The comparator 34 compares a physical page 40 from the address translation register 14 to each set of tags 50. The comparator 34 generates a control signal 42 that selects via the multiplexer 36 the one of the instructions 52 for which the corresponding tags 50 match to the physical page 40. The selected one of the instructions 52 provides an instruction 54 for use in the processor 12.

A similar arrangement may be implemented with a data cache or a combined instruction/data cache in other embodiments.

Figure 3:
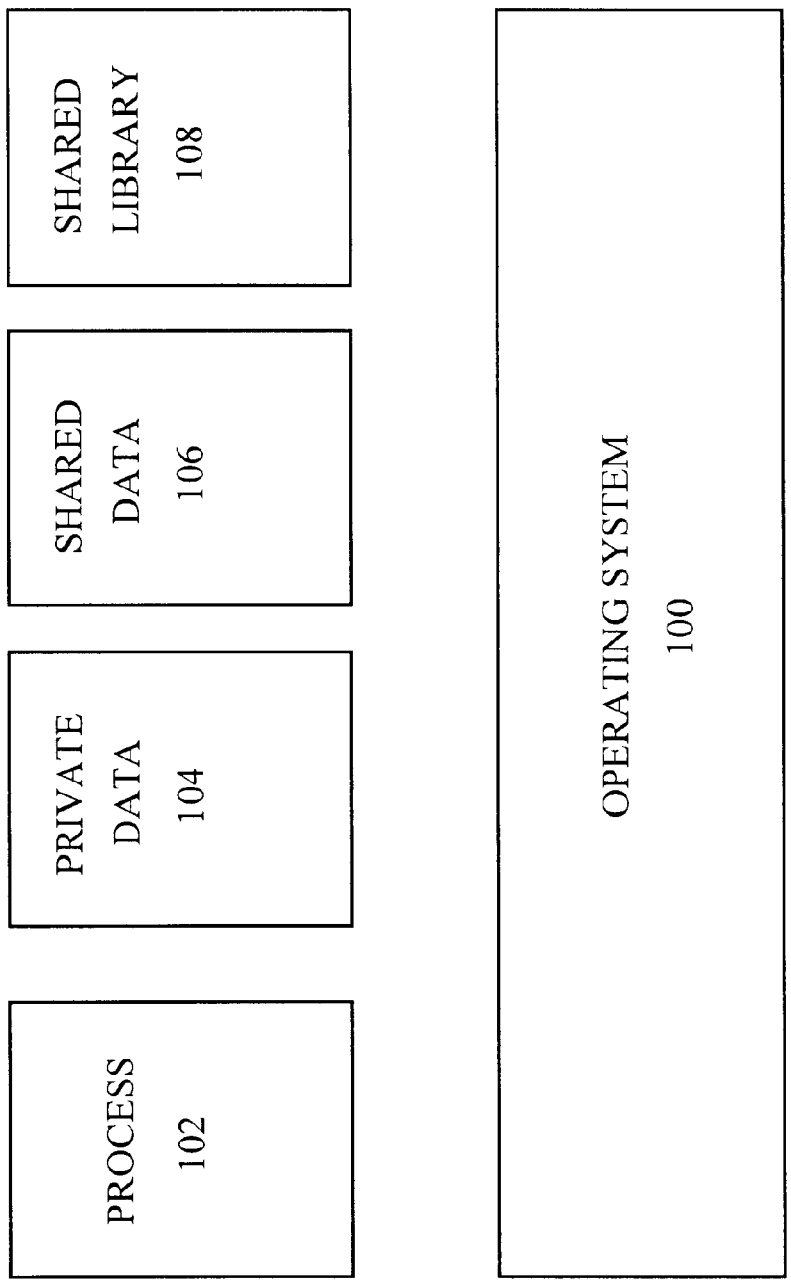
FIG. 3 shows an example software arrangement in a computer system.

FIG. 3 shows an example software arrangement in the computer system 10. The software in this example includes an operating system 100, a process 102, a set of private data 104 for the process 102, a set of shared data 106, and a shared library 108. The instructions in the process 102, the private data 104, the shared data 106, and the shared library 108 may be viewed separate logical areas that are accessed by the processor 12 when executing the process 102.

In one embodiment, the processor 12 is implemented with multiple address translation registers and the address translation registers are allocated to separate logical areas. For example, the general registers 22 may include a set of four address translation registers. One of the address translation registers may be allocated to the physical page or pages that contain the process 102 and another of the address translation registers may be allocated to the physical page or pages that contain the private data 104. Similarly, another of the address translation registers may be allocated to the physical page or pages that contain the shared data 106 and yet another of the translation registers may be allocated to the physical page or pages that contain the shared library 108.

The logical areas associated with the process 102 are preferably arranged in such a manner that each is contained in a single memory page or a relatively few memory pages. This is possible because the size of a physical page of memory in the computer system 10 is variable.

The above are just a few examples of arrangements for the address translation registers in the processor 12. Numerous others are possible.

If the process 102 can be accommodated using a single memory page per logical area, then the address translation registers in the processor 12 may be all that is needed for holding address translation information. If the process 102 cannot be accommodated using a single memory page per logical area, then it may be desirable to provide the processor 12 with a translation-look-aside buffer in addition to address translation registers.

Figure 4:
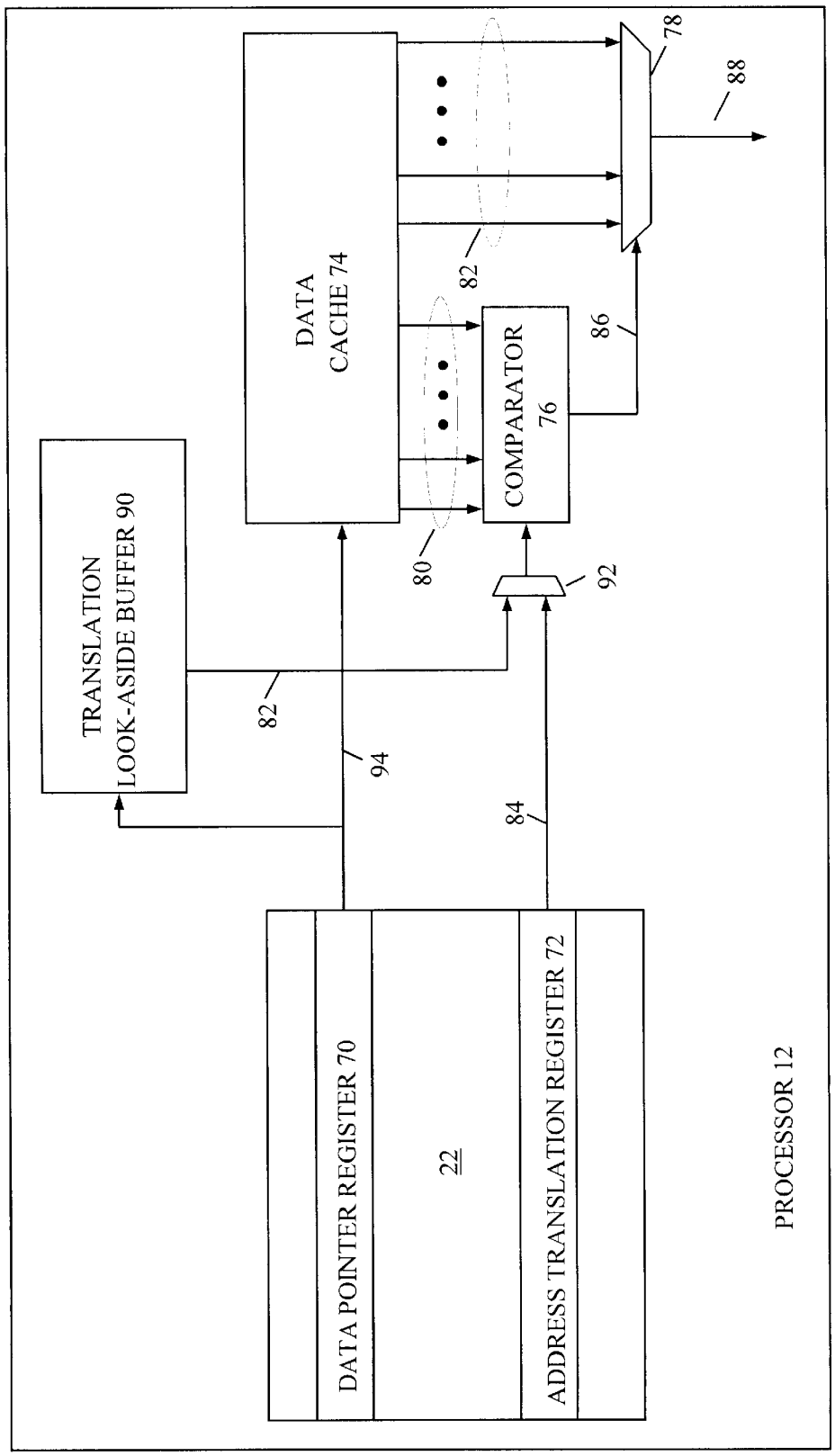
FIG. 4 shows an embodiment that includes an address translation register and a translation look-aside buffer.

FIG. 4 shows an embodiment of the processor 12 that includes a translation look-aside buffer 90 along with one or more address translation registers. The general registers 22 of the processor 12 include a data pointer register 70 that holds a virtual address of data to be fetched and an address translation register 72 that holds translation information for the data fetch. The processor 12 in this embodiment includes a data cache 74.

The virtual address from the data pointer register 70 provides an address input 94 to both the data cache 74 and the translation look-aside buffer 90. Multiple sets of tags 80 and data 82 from the entries of the data cache 74 selected by the address input 94 are read out to a comparator 76 and a multiplexer 78, respectively, and a physical page 82 is read out of the translation look-aside buffer 90. The comparator 76 compares a physical page 84 from the address translation register 72 or a physical page 82 from the translation look-aside buffer 90 to each set of tags 80. The comparator 76 generates a control signal 86 that selects via the multiplexer 78 the one of the sets of data 82 for which the corresponding tags 80 match to the physical page 82 or 84 selected via a multiplexor 92. The selected one of the data 82 provides a set of data 88 for use in the processor 12.

The address translation register 72 and the translation look-aside buffer 90 operate in coordination. The lookup for translation information to the address translation register 72 may be performed in parallel with the lookup for translation information to the translation look-aside buffer 90. Alternatively, the lookup may be performed first to the address translation register 72 and then to the translation look-aside buffer 90. In another alternative, the lookup may performed to the address translation register 72 only if a mechanism in the processor 12 indicates that the address translation register 72 holds the needed translation information. For example, if the private data 104 for the process 102 is all contained in the same physical page then the processor 12 may include a mechanism for specifying that only the address translation register 72 is to be used during a translation lookup for the private data 104.

The address translation register 72 enables a relaxation in the timing pressures imposed on the translation look-aside buffer 90 thereby saving chip space and reducing power consumption by the processor 12 in comparison to prior implementation of on-chip TLBs.

Another advantage of using a combination of the address translation register 72 and the translation look-aside buffer 90 is that the translation information for frequently used virtual addresses can be maintained in the address translation register 72. Given that the address translation information in the address translation register 72 is associated with the process 102 and gets restored with a context switch, this address translation information for frequently used virtual addresses is not evicted out of the translation look-aside buffer 90 and is not subject to a long latency TLB miss or movement to a lower level in the translation look-aside buffer 90 that has a longer latency.

It is desirable to maintain the address translation register 72 and the translation look-aside buffer 90 such that the same address translation information does not appear in both. This offers the advantage of making the translation look-aside buffer 90 appear larger and more associative.

The translations allocated to the process 102 and set in the address translation registers of the processor 12 may be set at compile time or by an executable loader. It is desirable that these translations be the most frequently accessed by the process 102. The operating system 100 may have a mechanism to place a different translation in the address translation registers of the processor 12 if the operating system 100 detects frequent accesses to one or more pages.

At the time of a context switch, the address translation information from the address translation registers in the processor 12 are stored with the process switch and restored the next time the process 102 is executed. This avoids long latency TLB misses for these pages even after a context switch. In addition, the executable loader may load the address translation registers of the processor 12 before execution begins if the appropriate address translation information is known, thereby avoiding an initial TLB miss.

The address translation registers in the processor 12 may be allocated individually or collectively to the instruction and data spaces. An additional set of address translation registers may be implemented in the processor 12 for use with the operating system 100 translations. This minimizes the pollution effects of system calls and other activity by the operating system 100.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A processor having a set of general registers including at least one pointer register and at least one address translation register for holding a physical address which corresponds to a virtual address in the pointer register such that the general registers provide the physical address to a memory during an access to the memory which corresponds to the virtual address in the pointer register.

2. The processor of claim 1, wherein the general registers include multiple address translation registers each allocated to a logical area associated with a process executed by the processor.

3. The processor of claim 2, wherein the process is adapted such that the logical area is contained within a memory page.

4. The processor of claim 2, wherein the process is adapted such that the logical area is contained within a relatively few memory pages.

5. The processor of claim 2, wherein the logical area contains a set of instructions for the process.

6. The processor of claim 2, wherein the logical area contains a set of private data for the process.

7. The processor of claim 2, wherein the logical area contains a set of shared data.

8. The processor of claim 2, wherein the logical area contains a shared library.

9. The processor of claim 1, wherein the information in the address translation registers is saved and restored during a context switch.

10. The processor of claim 1, further comprising a translation look-aside buffer that operates in coordination with the address translation registers.

11. The processor of claim 1, wherein one or more of the address translation registers are allocated to an operating system executed by the processor.

12. A method for accessing a memory, comprising the steps of:
 providing a processor with a general register set that includes at least one pointer register and at least one address translation register;
 storing a virtual address for an access to the memory in the pointer register;
 storing a physical address for the access into the address translation register;
 providing the physical address from the general register set to the memory during the access.

13. The method of claim 12, further comprising the step of allocating-each address translation register to a logical area associated with a process executed by the processor.

14. The method of claim 13, further comprising the step of adapting the process such that the logical area is contained within a memory page.

15. The method of claim 13, further comprising the step of adapting the process such that the logical area is contained within a relatively few memory pages.

16. The method of claim 13, wherein the step of allocating each address translation register to a logical area comprises the step of allocating one of the address translation registers to a logical area that contains a set of instructions for the process.

17. The method of claim 13, wherein the step of allocating each address translation register to a logical area comprises the step of allocating one of the address translation registers to a logical area that contains a set of private data for the process.

18. The method of claim 13, wherein the step of allocating each address translation register to a logical area comprises the step of allocating one of the address translation registers to a logical area that contains a set of shared data.

19. The method of claim 13, wherein the step of allocating each address translation register to a logical area comprises the step of allocating one of the address translation registers to a logical area that contains a shared library.

20. The method of claim 12, further comprising the steps of saving and restoring contents of the general register set including the address translation register during a context switch.

\* \* \* \* \*